W. C. Edenfield,
Stone Drill.

No. 95,672. Patented Oct. 12, 1869.

WITNESSES
E. Wolff
Wm. A. Morgan

INVENTOR
W. C. Edenfield,
pr. Munn & Co.
Attorneys

United States Patent Office.

W. C. EDENFIELD, OF SAVANNAH, MISSOURI.

Letters Patent No. 95,672, dated October 12, 1869; antedated September 27, 1869.

IMPROVED STONE-DRILL.

The Schedule referred to in these Letters Patent and making part of the same.

*To all whom it may concern:*

Be it known that I, W. C. EDENFIELD, of Savannah, in the county of Andrew, and State of Missouri, have invented a new and improved Stone-Drill; and I do hereby declare that the following is a full, clear, and exact description thereof, which will enable others skilled in the art to make and use the same, reference being had to the accompanying drawings, forming part of this specification, in which—

Figure 1:
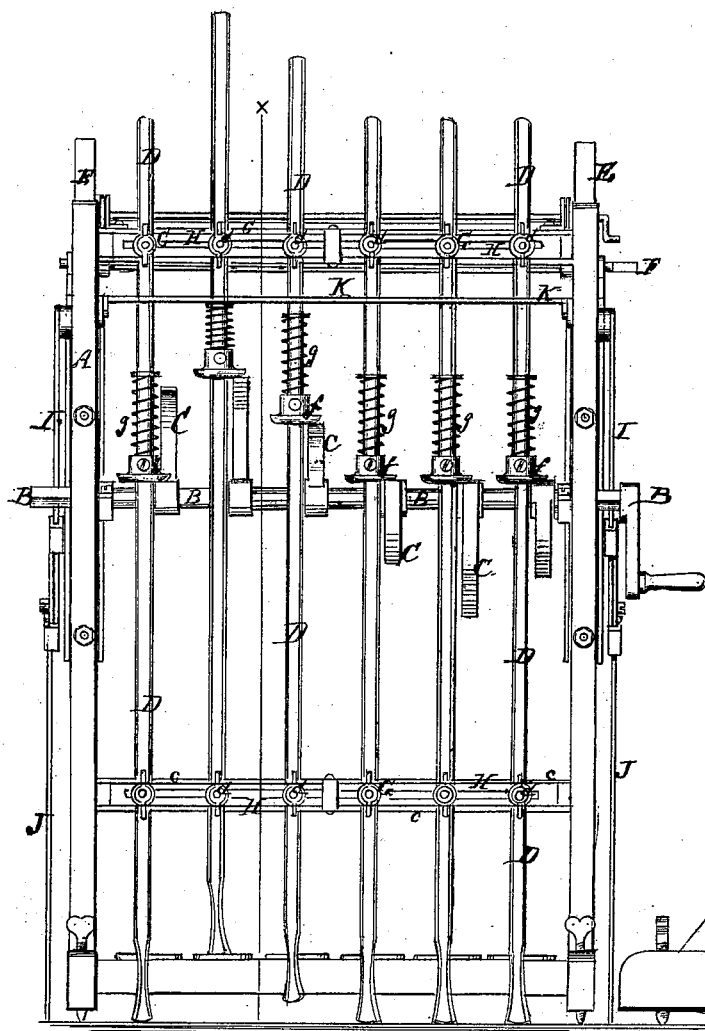
Figure 1 represents a side elevation of my improved stone-drill.
Figure 2:
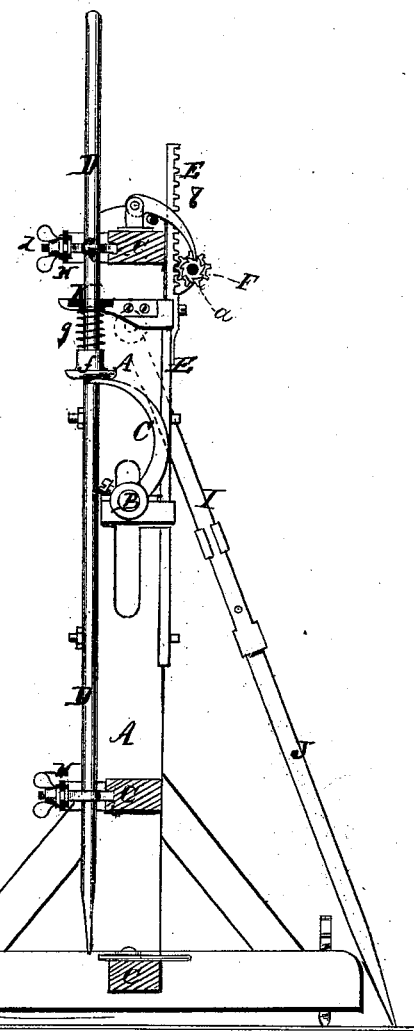
Figure 2 is a vertical transverse shaft of the same, taken on the plane of the line $x\, x$, fig. 1.
Figure 3:
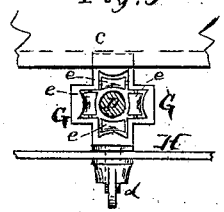
Figures 4, 5:
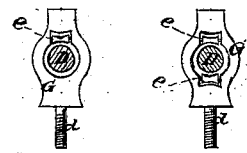

Figures 3, 4, and 5 are detail plan views of the adjustable guides for the drills.

Similar letters of reference indicate like parts.

The object of this invention is to reduce the friction against the reciprocating drills.

The improvements relate to the rock-drilling machine, for which Letters Patent of the United States were issued to A. M. Southard and W. J. Hobson, on the 3d day of September, 1867, and on the 28th day of April, 1868.

The invention consists in providing the adjustable eyes or guides of the drills with friction-rollers, which have concave faces adapting themselves to the circular inner faces of the said eyes, so that the cylindrical drills can play in them with reduced friction.

B is the horizontal operating shaft, which carries the cams $c\, c$, for working the drills D.

The shaft B has its bearings in an up-and-down adjustable frame, E, which can be raised or lowered by means of a shaft, F, having pinions $a\, a$, that mesh into toothed bars $b\, b$, formed on E, as shown.

The drills D D fit through eyes G G, that are laterally adjustable in horizontal grooved bars $c\, c$, of the frame A, and that are, with their projecting screw-shanks $d\, d$, fitted through slotted bars H, that are attached to the frame.

The eyes G are provided with friction-rollers $e\, e$, which are arranged in them, as shown in figs. 3, 4, and 5, that is, either one, two, or more, such rollers are arranged in one eye.

As the drills are mostly of cylindrical form, the rollers in the eyes are made with concave sides, so as to be adapted to the drills, as shown.

The eyes are adjustable, as aforesaid, and as described in the afore-mentioned Letters Patent.

To the frame A are pivoted bars I I, that are provided with extension-pieces J, so that they can be lengthened or shortened at will. They serve to brace the frame in an inclined or other suitable position, in case the holes to be bored are to be oblique or on uneven ground.

$f\, f$ are the shoulders, fitted upon the drills, to allow the cams to operate said drills. Above these shoulders are fitted around the drills, coiled springs $g\, g$, that are, when the drills are raised, compressed against an upper slotted bar, K, arranged on the frame A, and that serve to drive the drills down with greater force.

Having thus described my invention,

I claim as new, and desire to secure by Letters Patent—

The eyes G G, constructed as described, with the screw-shanks $d$, and the internal friction-rollers $e$, and adapted for adjustment laterally in the horizontal grooved bars $c$, as herein described, for the purpose specified.

W. C. EDENFIELD.

Witnesses:
JOHN J. MILLER,
GEO. H. HOBSON.